US011516355B2

(12) United States Patent
Robles Flores et al.

(10) Patent No.: US 11,516,355 B2
(45) Date of Patent: *Nov. 29, 2022

(54) DEFECT DETECTION FOR MULTI-FUNCTION DEVICES USING MACHINE LEARNING

(71) Applicant: Xerox Corporation, Norwalk, CT (US)

(72) Inventors: Eliud Robles Flores, Rochester, NY (US); Paul Roberts Conlon, South Bristol, NY (US); David C. Craig, Pittsford, NY (US); Lee C. Moore, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,939

(22) Filed: Oct. 22, 2021

(65) Prior Publication Data

US 2022/0201135 A1 Jun. 23, 2022

Related U.S. Application Data

(63) Continuation of application No. 17/129,791, filed on Dec. 21, 2020, now Pat. No. 11,240,385.

(51) Int. Cl.
*H04N 1/00* (2006.01)
*H04N 1/19* (2006.01)

(52) U.S. Cl.
CPC ..... *H04N 1/00344* (2013.01); *H04N 1/00029* (2013.01); *H04N 1/00037* (2013.01); *H04N 1/1906* (2013.01)

(58) Field of Classification Search
None
See application file for complete search history.

(56) References Cited

U.S. PATENT DOCUMENTS

| 6,282,687 | B1 | 8/2001 | Maeda et al. |
| 10,198,809 | B2 | 2/2019 | Schweid et al. |
| 10,216,565 | B2 | 2/2019 | Cunico et al. |
| 10,404,868 | B2 | 9/2019 | Spivakovsky et al. |
| 10,831,417 | B1* | 11/2020 | Su .......................... G06N 20/00 |
| 11,240,385 | B1* | 2/2022 | Robles Flores ...... H04N 1/1906 |
| 2010/0303281 | A1 | 12/2010 | Wu et al. |
| 2012/0013935 | A1 | 1/2012 | Adachi |
| 2015/0227838 | A1 | 8/2015 | Wang et al. |
| 2020/0134373 | A1* | 4/2020 | Oikawa ................. G06F 3/1208 |
| 2020/0361210 | A1* | 11/2020 | Sato ...................... G06N 3/0454 |
| 2020/0393998 | A1* | 12/2020 | Su .......................... G06F 3/1208 |
| 2021/0114368 | A1* | 4/2021 | Ukishima .......... H04N 1/00045 |
| 2021/0285672 | A1 | 9/2021 | Samusevich et al. |
| 2021/0287353 | A1* | 9/2021 | Soltwedel ........... B41F 33/0081 |

* cited by examiner

*Primary Examiner* — Dov Popovici

(57) ABSTRACT

A method is disclosed. For example, the method executed by a processor of a multi-function device (MFD) includes executing a defect learning routine to identify defects, cataloging the defects based on a job function, a type of paper, and a machine state, receiving a job request, determining a known defect that has been catalogued based on the job function, the type of paper, and the machine state, and presenting a visualization of the known defect on a display of a user interface before executing the job request.

20 Claims, 6 Drawing Sheets

DEFECT DETECTION FOR MULTI-FUNCTION DEVICES USING MACHINE LEARNING

CROSS REFERENCE TO RELATED APPLICATIONS

This application is a continuation of recently allowed U.S. patent application Ser. No. 17/129,791, filed on Dec. 21, 2020, which is hereby incorporated by reference in its entirety.

FIELD OF THE DISCLOSURE

The present disclosure relates generally to multi-function devices (MFDs), and relates more particularly to MFDs that can automatically detect defects using machine learning.

BACKGROUND

Multi-function devices (MFDs) are used to process print jobs. An MFD can perform a variety of different functions including printing, scanning, copying, faxing, and the like.

In today's printing environment, customers demand the highest and best image quality at the fastest speeds for the lowest price. Defects can slow down a customer's production, costing the customer's time and money.

Defects can be caused by various different functions and/or components of the MFD. Current defect detection is performed manually. For example, a job may be completed on the MFD and the user may see the defects on the output (e.g., the printed media or electronic image of a scanned document). The user may then have to try to find the cause of the defect via trial and error, which may be time consuming and inefficient.

SUMMARY

According to aspects illustrated herein, there are provided a method and a non-transitory computer readable medium for executing a maintenance routine based on a defect class associated with a machine state. One disclosed feature of the embodiments is a method, executed by a processor of the MFD, that comprises executing a defect learning routine to identify defects, cataloguing the defects based on a job function, a type of paper, and a machine state, receiving a job request, determining a known defect that has been catalogued based on the job function, the type of paper, and the machine state, and presenting a visualization of the known defect on a display of a user interface before executing the job request.

Another disclosed feature of the embodiments is a non-transitory computer-readable medium having stored thereon a plurality of instructions, the plurality of instructions including instructions which, when executed by a processor, cause the processor to perform operations to execute a defect learning routine to identify defects, catalogue the defects based on a job function, a type of paper, and a machine state, receive a job request, determine a known defect that has been catalogued based on the job function, the type of paper, and the machine state, and present a visualization of the known defect on a display of a user interface before executing the job request.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to detect defects on an MFD using machine learning. As discussed above, defects can be caused by various different functions and/or components of the MFD. Current defect detection is performed manually. For example, a job may be completed on the MFD and the user may see the defects on the output (e.g., the printed media or electronic image of a scanned document). The user may then have to try to find the cause of the defect via trial and error, which may be time consuming and inefficient.

The present disclosure provides specific routines to learn defects using machine learning. For example, diagnostic routines and maintenance routines can be used to learn defects, identify what caused the defects, and warn a user with a notification on the user interface of any potential defects. In addition, the user interface may present the user with options to automatically correct the potential defects.

The specific routines may be performed to identify that a defect is associated with a particular function (e.g., print, copy, and email/scan). The specific routines may also isolate what is causing the defect for the particular function associated with the defect. Thus, the present disclosure provides an MFD that can detect defects using machine learning, as described below.

Figure 1:
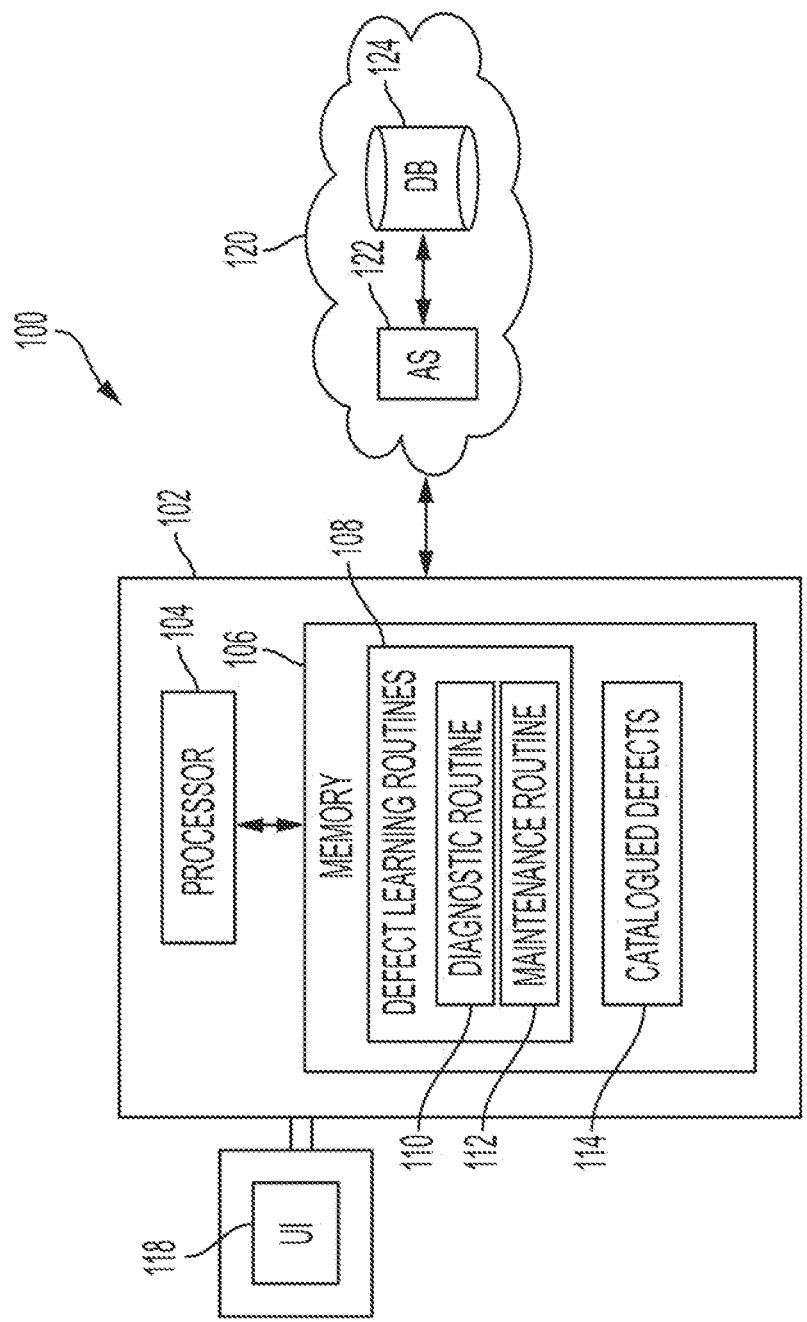
FIG. 1 illustrates a block diagram of an example network with an MFD of the present disclosure.

FIG. 1 illustrates an example network 100 of the present disclosure. In one embodiment, the network 100 may include an MFD 102 and an Internet Protocol (IP) network 120. Although a single MFD 102 is illustrated in FIG. 1, it should be noted that a plurality of MFDs 102 located remotely from one another at different geographic locations may be deployed and communicatively coupled to the IP network 120.

It should also be noted that the IP network 120 has been simplified for ease of explanation and may include additional components that are not shown. For example, the IP network 120 may include additional access networks, gateways, firewalls, access points, and the like.

In one embodiment, the IP network 120 may include a remotely located application server (AS) 122 and a database (DB) 124. The AS 122 may be communicatively coupled to the DB 124. The AS 122 may include a processor to execute various applications and/or instructions. The DB 124 may include non-transitory computer readable memory that may store data. In one embodiment, the DB 124 may store catalogued defects, as discussed in further details below.

Thus, in one embodiment, the AS 122 and the DB 124 may perform the defect detection, as described below, for networked MFDs 102.

In one embodiment, the MFD 102 may include a processor 104, a memory 106, and a user interface 118. The processor 104 may be communicatively coupled to the memory 106 and the user interface 118. The processor 104 may control operation of the user interface 118. The processor 104 may also execute instructions stored in the memory 106 to perform the functions described herein.

It should be noted that the MFD 102 has been simplified for ease of explanation and may include additional components that are not shown. For example, the MFD 102 may include a paper tray, print heads, a toner cartridge, paper path, one or more finishing modules, and the like.

In one embodiment, the user interface 118 may be a touch screen graphical user interface (GUI). In one embodiment, the user interface 118 may be a display with physical buttons to navigate various menus shown on the display. The user interface 118 may display a visualization of defects to a user, as discussed in further details below.

In one embodiment, the memory 106 may be a non-transitory computer readable storage medium. The memory 106 may be a hard disk drive, a solid state drive, a random access memory (RAM), a read-only memory (ROM), and the like.

In one embodiment, the memory 106 may store defect learning routines 108 and catalogued defects 114. The defect learning routines 108 may include a diagnostic routine 110 and a maintenance routine 112. The defect learning routines 108 may be executed by the processor 104 using printed, copied, and scanned images to learn defects based on a job function, a type of paper, and/or a machine state.

In one embodiment, the job function may be one of the functions executed by the MFD 102. For example, the job functions may include a print function, a copy function, or a scanning/email function. In one embodiment, the type of paper may also contribute to different types of defects. The type of paper that is loaded in the MFD 102 for a particular job may be entered via the user interface 118.

In one embodiment, the machine state may indicate a status of various components of the MFD 102. For example, the machine state may be associated with a print component, a full width array of the optical scanner, a photoreceptor, a maintenance status (e.g., elapsed time since last cleaning of a platen glass, last cleaning of print components, last performance of a purging operation, and so forth). In one embodiment, a value may be associated with the machine state. The value may be an amount of time that has elapsed. In other words, the machine state may track the amount of time that has elapsed since the printhead was replaced, since the photoreceptor was replaced, and so forth.

In one embodiment, the job function, different types of paper, and/or the machine state may contribute differently to different types of defects. Table 1 below illustrates a breakdown of different defects based on job functions.

TABLE 1

DEFECTS BY JOB FUNCTION

|  |  | PRINT | COPY | SCAN/EMAIL |
|---|---|---|---|---|
| INPUT | Original | Resolution | Dirt, Dings, Impurities | Dirt, Dings, Impurities |
|  | Paper | Dirt, Dings, Impurities | Dirt, Dings, Impurities | Not Applicable |

TABLE 1-continued

DEFECTS BY JOB FUNCTION

|  |  | PRINT | COPY | SCAN/EMAIL |
|---|---|---|---|---|
| PROCESS | Scanner | Not Applicable | Glass, Full Width Array, Resolution | Glass, Full Width Array, Resolution |
|  | Printer | Photoreceptor, Charge, Developer, Fuser, Transfer, Resolution | Photoreceptor, Charge, Developer, Fuser, Transfer, Resolution | Not Applicable |
| Output |  | Defective Print | Defective Copy | Defective Scan |

As can be seen in Table 1, different inputs and processes may contribute to defects for the different job functions. The defect learning routines 108 may be executed to learn which combinations of job functions, inputs (e.g., paper type), and processes (e.g., machine states and/or replacement of various components associated with the process of a job function) lead to which defects. The defects may then be identified, labeled, and catalogued in the catalogued defects 114. As noted above, the catalogued defects 114 may be stored locally in the memory 106 or may be transmitted to the AS 122 in the IP network 120 to be stored in the DB 124.

Figure 3:
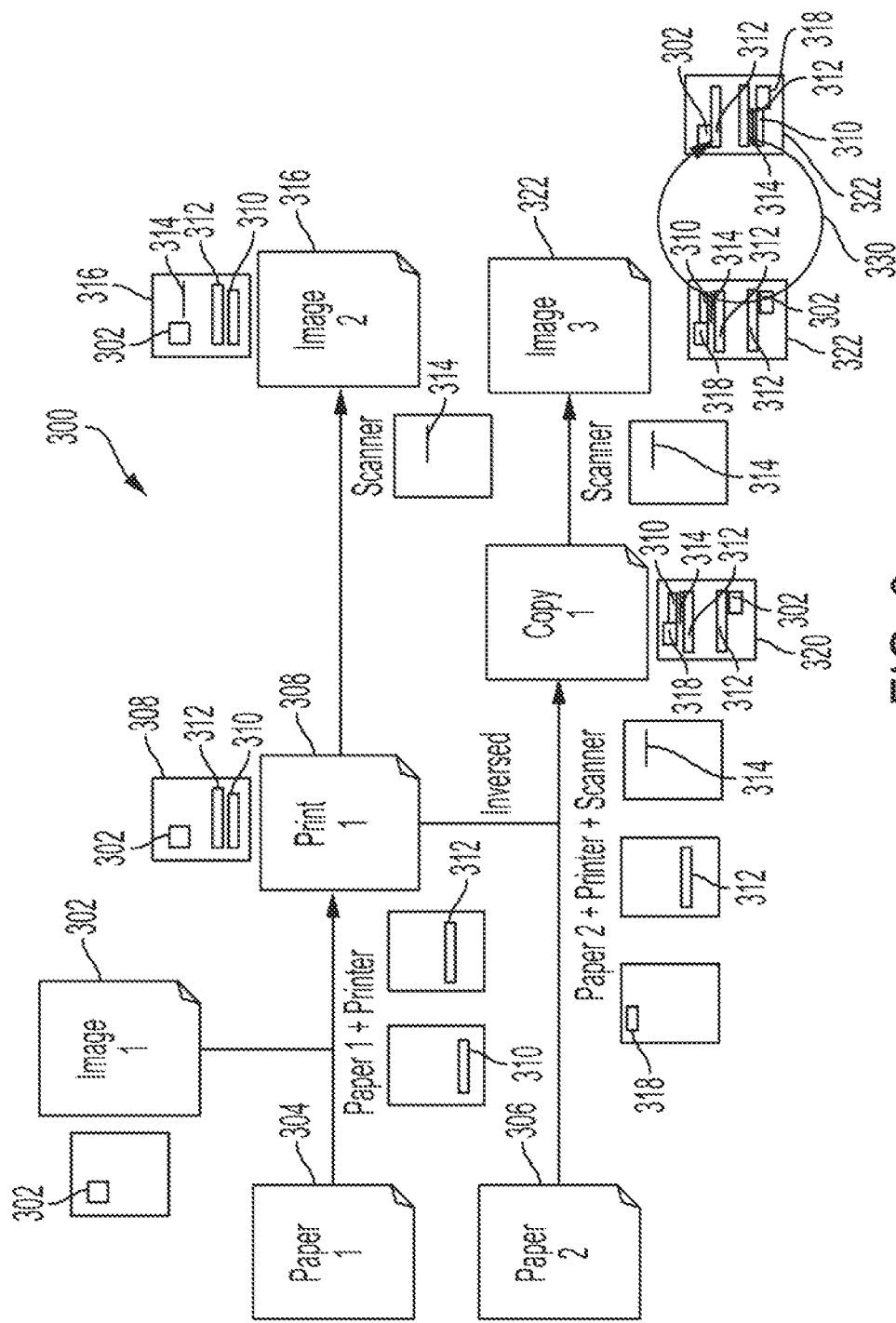
FIG. 3 illustrates an example of defect learning via a diagnostic routine of the present disclosure.
Figure 4:
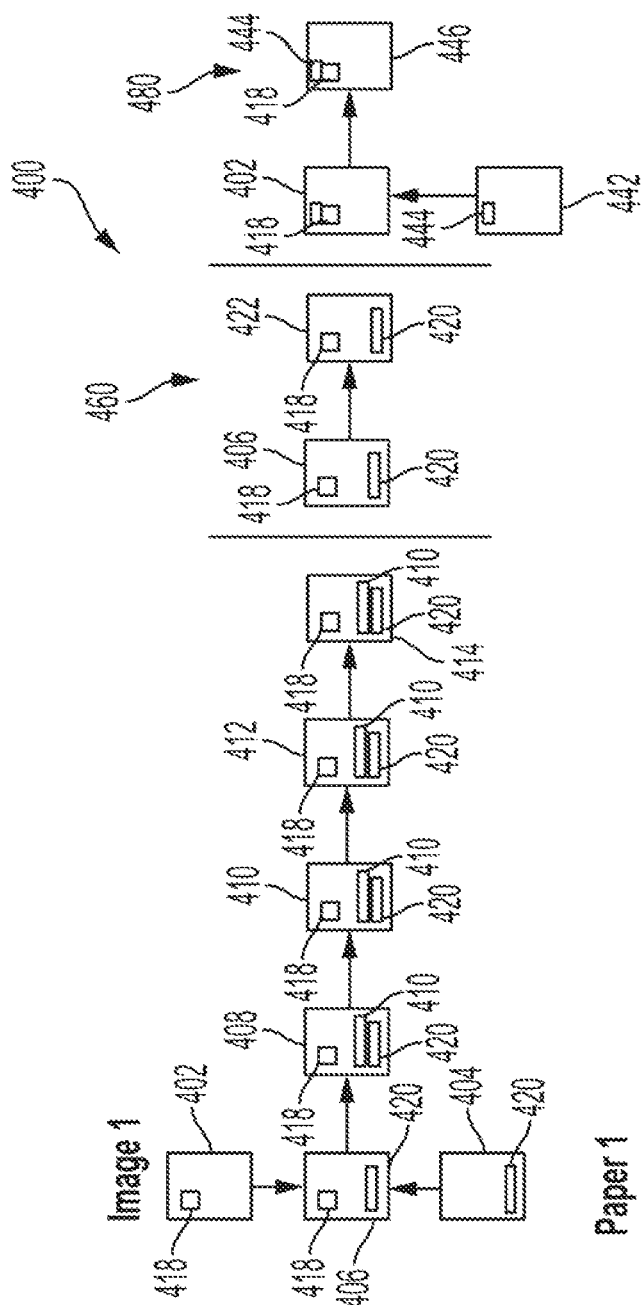
FIG. 4 illustrates an example of defect learning via a maintenance routine of the present disclosure.

FIGS. 3 and 4 illustrate example flow charts of the diagnostic routine 110 and the maintenance routine 112. The diagnostic routine 110 may be executed to associate defects with particular job functions and paper types. The maintenance routine 112 may be executed to associate defects with a particular machine state.

FIG. 3 illustrates a flow chart 300 of the diagnostic routine 110. In one embodiment, the flow chart 300 may begin with an image 302. The image 302 may be a graphic that is to be printed. The image 302 may be provided from a computing device that is communicatively coupled to the MFD 102 or from a memory device connected to the MFD 102 via an interface (e.g., a universal serial bus (USB) interface). The image 302 may have a particular resolution.

The image 302 may be printed on a first type of paper 304 via execution of a print job function. The first type of paper 304 may cause a defect 310. The print job function may cause a defect 312. Thus, when the image 302 is printed, the printed image 308 may include the image 302, the defect 310, and the defect 312.

The printed image 308 may then be scanned via execution of a scan job function. The scanner that performs the scan job function may cause a defect 314. A scanned image 316 may be generated by the scan job function. The scanned image 316 may include the image 302, the defect 310, the defect 312, and the defect 314.

The printed image 308 is then inversed and copied via execution of a copy job function. The printed image 308 may be inversed by rotating the printed image 308 180 degrees. The inversed printed image 308 may be copied on a second type of paper 306. The second type of paper 306 may cause a defect 318. The print job function may cause the defect 312, and the scanner that performs the copy job function may cause the defect 314, as noted above.

The copy of the inverse of the printed image 308 may generate a copied image 320. The copied image 320 may include the image 302, the defect 310, and the defect 312 from the printed image 302, but inversed or upside down relative to the printed image 302. The copied image 320 may also include the defect 318 caused by the second type of paper 306, a second instance of the defect 312, and the defect 314.

The copied image 320 may then be scanned to generate a second scanned image 322. The second scanned image 322 may then be rotated 180 degrees, as shown by an arrow 330. The rotated second scanned image 322 may be compared to the scanned image 316 and analyzed by the processor 104 to determine the cause of the defects 310, 312, 314, and 318.

In one embodiment, "flipped" artifacts may be defects caused by the scan job function. "Flipped" may be defined as moving from one side of the page to the opposite side. For example, the defect 314 has moved from the top of the page in the scanned image 316 to the bottom of the page in the image 322. Thus, the defect 314 may be identified and labeled as being caused by the scan job function.

In one embodiment, "mirrored" artifacts may be defects caused by the print job function. "Mirrored" may be defined as having an identical artifact on both sides of a page. For example, if the page is divided in the middle of the page, the artifact would show up in the same relative position on opposite sides of the middle of the page. For example, the defect 312 appears on both the top half and in the same location on the bottom half of the second scanned image 322. Thus, the defect 312 may be identified and labeled as being caused by the print job function.

In one embodiment, some artifacts may appear in the same location in the scanned image 316 and the second scanned image 322. In addition, the artifact may not be duplicated within the second scanned image 322. These types of artifacts may be identified and labeled as being caused by the first type of paper 304. In one embodiment, a new artifact that appears in the second scanned image 322, but does not appear in the first scanned image 316 may be identified and labeled as being caused by the second type of paper 306.

In one embodiment, the flow chart 300 may be repeated for different types of paper that are used. In one embodiment, the flow chart 300 may be performed when the MFD 102 is deployed for operation and a new type of paper is loaded into the MFD 102. Thus, the MFD 102 may learn new defects associated with different types of paper over time. The MFD 102 may then identify and label the defects to be associated with the different types of paper.

The defects that are associated with the particular job function (e.g., print job function, copy job function, and scan job function) may then be compared to possible causes shown in Table 1 to correct the defects that are identified.

FIG. 4 illustrates a flow chart 400 for the maintenance routine 112. The maintenance routine 112 may identify and label defects with a machine state or when replacements occur. In one embodiment, an electronic file 402 may include an image 418. The electronic file 402 to be printed may be provided to the MFD 102 from a computing device or a memory device connected via USB interface. The image 418 may be printed on a first type of paper 404. The first type of paper 404 may cause a defect 420. The defect 420 may be identified from the diagnostic routine 110, as illustrated by the flow chart 300 in FIG. 3.

In one embodiment, a printed image 406 may be generated that includes the image 418 and the defect 420 caused by the first type of paper 404. Over time, printed images 408, 410, 412, and 414 may be generated by the print job function. The printed images 408, 410, 412, and 414 may be printed on the first type of paper 404 to include the image 418. The printed images 408, 410, 412, and 414, may include the defect 420 caused by the first type of paper 404.

However, the printed images 408, 410, 412, and 414 may gradually develop a defect 410 over time. As can be seen in FIG. 4, the defect 410 becomes more noticeable over time with each successive printed image 408, 410, 412, and 414. Different maintenance routines may be performed to change machine states. For example, a photoreceptor may be replaced to change the machine state of the photoreceptor to 0 (e.g., the photoreceptor is new and no time has elapsed since the photoreceptor has been replaced).

At time 460, the image 418 may be printed after the photoreceptor has been replaced to generate a printed image 422. The printed image 422 may be compared to the first printed image 406. The processor 104 may analyze the printed image 406 and the printed image 422 to determine that the defect 410 has disappeared or has been corrected. Thus, the processor 104 may identify and label the defect 410 as being associated with a machine state of the photoreceptor. Thus, when the defect 410 is detected in a printed image, the age of the photoreceptor may be the cause during a print job function.

At a later time 480, the first type of paper 404 may be replaced in the paper tray with a second type of paper 442. In one embodiment, the second type of paper 442 may be the same as the first type of paper 404, but from a different batch or box of paper. The second type of paper 442 may cause a defect 444. The electronic file 402 may be received by the MFD 102 to print the image 418. The image 418 may be printed on the second type of paper 442 to create a printed image 446. The printed image 446 may include the defect 444. The machine state of paper tray reloading or paper change may be associated with the defect 444. For example, no other machine state may have changed other than the paper tray reloading. As a result, the processor 104 may identify the paper tray reloading as causing the defect 444.

In one embodiment, the maintenance routine 112 may be performed periodically as the MFD 102 is deployed for operation at a customer site. For example, the diagnostic routine 110 may be executed before the MFD 102 is deployed for operation 102 and the maintenance routine 112 may be periodically performed as machine states are changed during operation. In one embodiment, the maintenance routine 112 may be performed before the MFD 102 is deployed by changing different machine states to identify and label different defects.

In one embodiment, after the defects are catalogued, the MFD 102 may be deployed for operation. Based on the selected job function, the type of paper that is selected or used, and/or the machine state of various components, the MFD 102 may identify a potential defect. For example, the job function, type of paper, and the machine state may be compared to the job function, type of paper, and the machine state associated with defects that are catalogued in the catalogued defects 114 to see if there is a match. When a matching defect is found, the MFD 102 may present a visualization of the defect to the user via the user interface 118.

Figure 2:
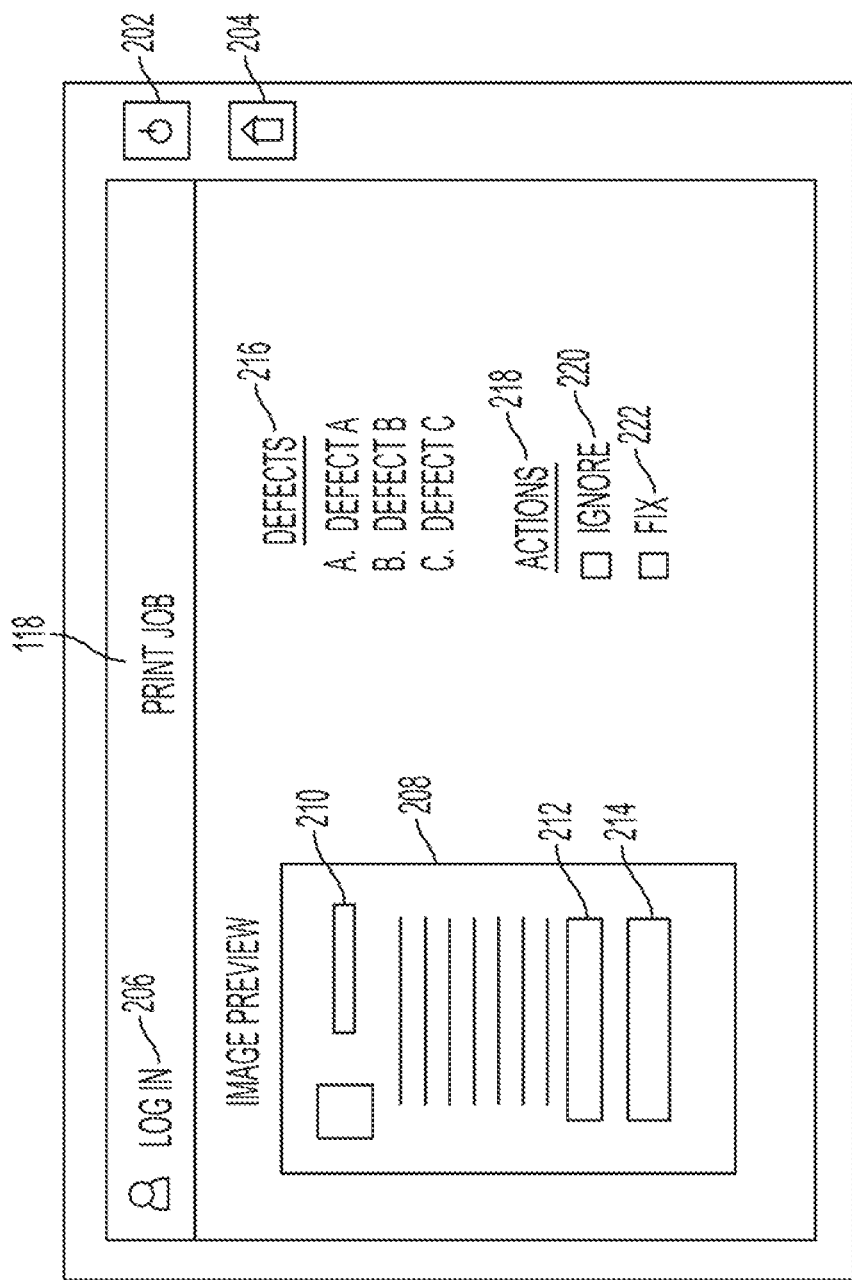
FIG. 2 illustrates an example screenshot a defect visualization presented on the user interface of the present disclosure.

FIG. 2 illustrates an example of the user interface 118 and a visualization of the defects. The user interface 118 may include physical buttons 202 and 204. For example, the physical button 202 may be a power button to turn on the MFD 102 and/or the user interface 118. The physical button 204 may be a home button to return the display to the home menu.

In one embodiment, the user interface 118 may include a graphical user interface that includes a touch screen. For example, the user interface may include an option to log-in 206 that can be selected by touching the portion of the display that presents "log in".

In one embodiment, the user interface 118 may present a visualization 208 of the defects that are identified based on a selected job function, paper type, and/or machine state. For example, the user may select a print job on a first type of paper. The MFD 102 may identify the machine state of various components that are associated with the print job process (e.g., shown in Table 1 above). The MFD 102 may then search the catalogued defects 114 for defects that have a matching job function, paper type, and/or machine state.

In one embodiment, defects 210, 212, and 214 may be found in the catalogued defects 114. The defects 210, 212, and 214 may be presented in the user interface 118 via the visualization 208. The visualization 208 may illustrates what the defects 210, 212, and 214 may look like and where on the page the defects 210, 212, and 214 may appear. Thus, a user may quickly see what defects may appear on the page.

The user interface 118 may also describe each defect in a list of defects 216. The user interface 118 may also present actions 218. The actions 218 may provide an option to ignore 220 and an option to fix 222. The ignore 220 option may allow a user to continue with the print job despite the defects 210, 212, and 214. For example, the print job may not require a high quality image. Thus, the user may continue with the print job despite the defects 210, 212, and 214.

In one embodiment, the fix option 222 may allow the user to try to have the MFD 102 perform a maintenance operation to fix the defects 210, 212, and 214. For example, if the defects are associated with the print job function, the MFD 102 may identify the components that are associated with the print job function that can be cleaned. The MFD 102 may perform a cleaning operation on the print head, a purging operation on the printhead, a cleaning operation on the photoreceptor, and the like. The machine state associated with these operations may be reset after they are performed.

In one embodiment, if the machine state calls for a replacement, the user interface 118 may present information related to which component should be replaced to fix the defect. In one embodiment, if any of the defects are caused by the paper type, the user interface 118 may notify the user to replace the paper type in a particular paper tray. The notification may include a suggestion of a type of paper to load that is known to not cause any defects.

In one embodiment, when the user selects the option to fix 222, the user interface 118 may break down which actions fix which defects 210, 212, and 214. For example, the defect 210 may be a minor defect. A quick printhead cleaning routine may fix the defects 212 and 214. Thus, the user may be presented an option to select defects 212 and 214 and to perform a fix for the defects 212 and 214. The defect 210 may be allowed to appear on the printed image.

Thus, the present disclosure provides an MFD 102 that may execute defect learning routines 108 to learn defects via machine learning. The MFD 102 may then catalogue the defects with labels to associate each defect with a job type, a paper type, and/or a machine type. The MFD 102 may then determine which defects may appear when deployed and when a user selects a job type with a particular type of paper given a machine state of one or more components of the MFD 102. The defects may be presented in a visualization 208 on the user interface 118 of the MFD 102. The user may then have the option to continue with the defects that may appear or try and fix the defects via maintenance routines performed automatically by the MFD 102 or replacement of certain components.

Figure 5:
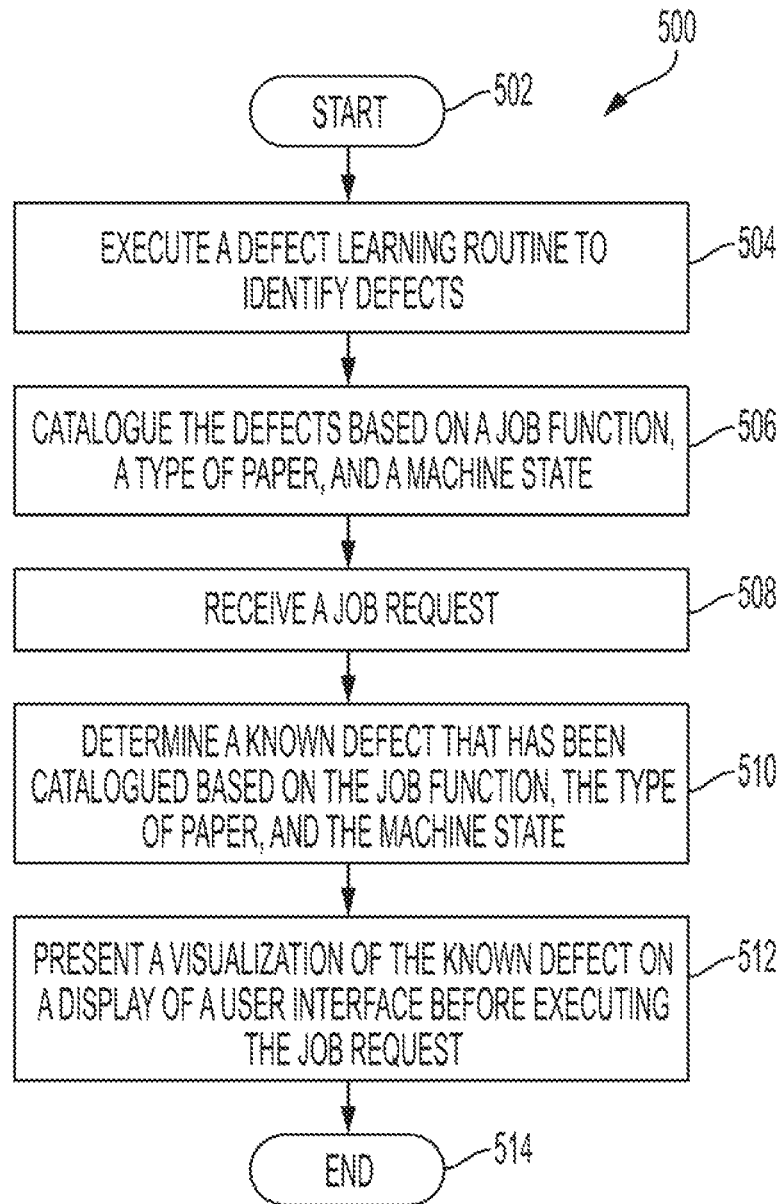
FIG. 5 illustrates a flow chart of a method of detecting a defect generated by a job executed by an MFD of the present disclosure.

FIG. 5 illustrates a flow chart of an example method 500 for detecting a defect generated by a job executed by an MFD of the present disclosure. In one embodiment, the method 500 may be performed by the MFD 102 or by an apparatus, such as the apparatus 600 illustrated in FIG. 6 and discussed below.

In one embodiment, the method 500 begins at block 502. At block 504, the method 500 executes a defect learning routine to identify defects.

At block 506, the method 500 catalogues the defects based on a job function, a type of paper, and a machine state. The defects may be catalogued by performing a defect learning routine. The defect learning routine may include a diagnostic routine and a maintenance routine.

In one embodiment, the diagnostic routine may generate a print out of an original image to be printed on a first type of paper. A first scanned image of the first print out may then be generated. A copy of an inverse of the print out may be generated on a second type of paper. A second scanned image of the copy may be generated. The defects on the print out, the first scanned image, the copy, and the second scanned image may be analyzed to identify defects caused by the job function and type of paper.

Analyzing the defects may include comparing the original image to the first scanned image to identify defects generated by a print function, a scanner function, and the first type of paper. The first scanned image may be compared to the second scanned image to identify the defects generated by the first type of paper, the second type of paper, the print function, and the scan function. A first set of defects may be identified from the defects that are flipped as a first type of defect associated with the scan function. A second set of defects may be identified from the defects that are mirrored as a second type of defect associated with the print function. A third set of defects may be identified from the defects that stayed as a third type of defect associated with the first type of paper. A fourth set of defects may be identified from the defects that are new as a fourth type of defect associated with the second type of paper. An example of the analysis is illustrated in FIG. 3 and described above.

In one embodiment, the maintenance routine may identify a defect due to a job function. For example, a defect may appear over time when the same job function is performed with the same type of paper. A change in the machine state may be determined. The defect may be absent on a subsequent execution of the job function on the same type of paper. As a result, the defect may be tagged as being associated with the machine state before the change.

For example, the job function may be a print job. A defect may appear gradually over time as the print job is repeated on the same type of paper. The machine state may be associated with a component that is part of the print job process. For example, the machine state may be associated with a printhead replacement status, a photoreceptor replacement status, a printhead cleaning operation, a paper tray reloading change, and the like.

In another example, the job function may be a scan job. A defect may appear gradually over time as the scan job is repeated. The machine state may be associated with a component that is part of the scan job process. For example, the machine state may be associated with a full width array status of an optical sensor.

The defects that are identified may be catalogued. The catalogue of defects may be stored in local memory or in a remotely located server. The remotely located server may be accessed by a network of MFDs over an IP network. Thus, the defect catalogue may be developed by defects detected from a large number of different MFDs over the IP network.

At block 508, the method 500 receives a job request. For example, after the defects are catalogued, the MFD may be deployed for operation. The user may select a particular job function on a particular type of paper. For example, the user may want to print an image on a particular type of plain 8.5 inch by 11 inch paper from a particular paper manufacturer.

At block 510, the method 500 determines a known defect that has been catalogued based on the job function, the type of paper, and the machine state. For example, various machine states associated with components that perform the print job function may be determined. The job function, the type of paper, and the machine states may be searched in the catalogued defects to determine if there is a defect that has a matching job function, type of paper, and machine states.

At block 512, the method presents a visualization of the known defect on a display of a user interface before executing the job request. When a match is found, the known defect may be presented in the visualization on the display of the user interface. The visualization may list the defects that are known and options to ignore the defects and continue or to fix the defects. At block 514, the method 500 ends.

Figure 6:
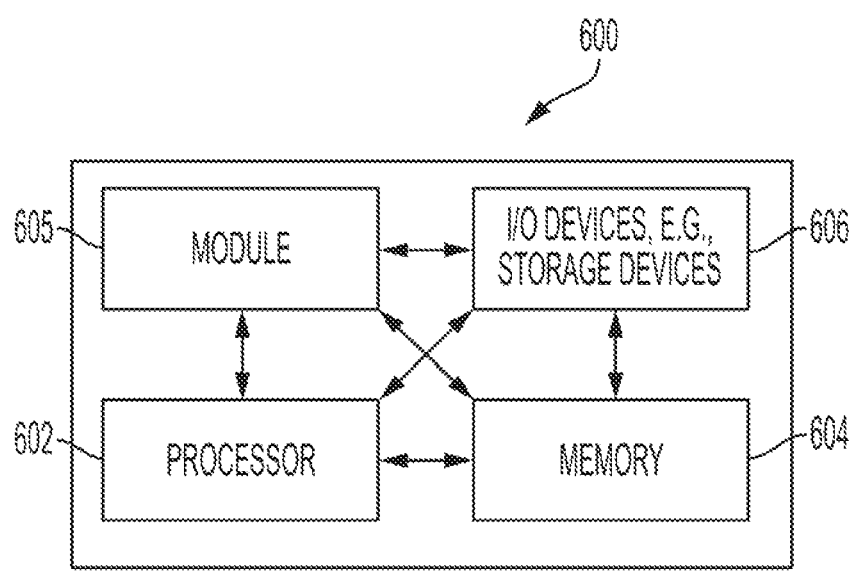
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for detecting a defect generated by a job executed by an MFD, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for detecting a defect generated by a job executed by an MFD (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for method for detecting a defect generated by a job executed by an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of operating a device, comprising:
   receiving, by a processor associated with the device, a job request;
   determining, by the processor, a known defect that has been catalogued as part of a defect learning routine to identify defects, wherein the know defect is based on at least one of: a job function, a type of paper, and a machine state; and
   presenting, by the processor, a visualization of the known defect on a display of a user interface before executing the job request.

2. The method of claim 1, wherein the defect learning routine comprises a diagnostic routine to identify a source of the defects by performing different job functions on different types of a paper and different rotations of the paper.

3. The method of claim 2, wherein the diagnostic routine comprises:
   generating, by the processor, a print out of an original image to be printed on a first type of paper;
   generating, by the processor, a first scanned image of the print out;
   generating, by the processor, a copy of an inverse of the print out on a second type of paper;
   generating, by the processor, a second scanned image of the copy; and
   analyzing, by the processor, defects on the print out, the first scanned image, the copy, and the second scanned image to identify defects caused by the job function and the type of paper.

4. The method of claim 3, wherein the analyzing comprises:
   comparing, by the processor, the original image to the first scanned image to identify defects generated by a print function, a scan function and the first type of paper;
   comparing, by the processor, the first scanned image to the second scanned image to identify defects generated by the first type of paper, the second type of paper, the print function, and the scan function;
   identifying, by the processor, a first set of defects from the defects that are flipped as a first type of defect associated with the scan function;
   identifying, by the processor, a second set of defects from the defects that are mirrored as a second type of defect associated with the print function;
   identifying, by the processor, a third set of defects from the defects that stayed as a third type of defect associated with the first type of paper; and identifying, by the processor, a fourth set of defects from the defects that are new as a fourth type of defect associated with the second type of paper.

5. The method of claim 1, wherein the visualization illustrates the known defect and presents an option for a user to continue with the job request.

6. The method of claim 1, wherein the visualization comprises an option for a user to fix the known defect with a maintenance operation executed by the device.

7. The method of claim 6, wherein the maintenance operation identifies components that are associated with the job request that can be cleaned, performs a cleaning operation, and resets a machine state associated with the components after the cleaning operation is performed.

8. The method of claim 6, wherein the maintenance operation identifies a component associated with the job request that is to be replaced.

9. The method of claim 6, wherein the maintenance operation identifies the type of paper selected for the job request that is associated with the known defect and notifies a user via the visualization to replace the type of paper for the job request.

10. The method of claim 1, wherein the visualization identifies which maintenance operations will fix which known defects.

11. A non-transitory computer-readable medium storing a plurality of instructions, which when executed by a processor of a device, causes the processor to perform operations comprising:
receiving a job request;
determining a known defect that has been catalogued as part of a defect learning routine to identify defects, wherein the know defect is based on at least one of: a job function, a type of paper, and a machine state; and
presenting a visualization of the known defect on a display of a user interface before executing the job request.

12. The non-transitory computer-readable medium of claim 11, wherein the defect learning routine comprises a diagnostic routine to identify a source of the defects by performing different job functions on different types of a paper and different rotations of the paper.

13. The non-transitory computer-readable medium of claim 12, wherein the diagnostic routine comprises:
generating a print out of an original image to be printed on a first type of paper;
generating a first scanned image of the print out;
generating a copy of an inverse of the print out on a second type of paper;
generating a second scanned image of the copy; and
analyzing defects on the print out, the first scanned image, the copy, and the second scanned image to identify defects caused by the job function and the type of paper.

14. The non-transitory computer-readable medium of claim 13, wherein the analyzing comprises:

comparing the original image to the first scanned image to identify defects generated by a print function, a scan function and the first type of paper;
comparing the first scanned image to the second scanned image to identify defects generated by the first type of paper, the second type of paper, the print function, and the scan function;
identifying a first set of defects from the defects that are flipped as a first type of defect associated with the scan function;
identifying a second set of defects from the defects that are mirrored as a second type of defect associated with the print function;
identifying a third set of defects from the defects that stayed as a third type of defect associated with the first type of paper; and
identifying a fourth set of defects from the defects that are new as a fourth type of defect associated with the second type of paper.

15. The non-transitory computer-readable medium of claim 11, wherein the visualization illustrates the known defect and presents an option for a user to continue with the job request.

16. The non-transitory computer-readable medium of claim 11, wherein the visualization comprises an option for a user to fix the known defect with a maintenance operation executed by the device.

17. The non-transitory computer-readable medium of claim 16, wherein the maintenance operation identifies components that are associated with the job request that can be cleaned, performs a cleaning operation, and resets a machine state associated with the components after the cleaning operation is performed.

18. The non-transitory computer-readable medium of claim 16, wherein the maintenance operation identifies a component associated with the job request that is to be replaced.

19. The non-transitory computer-readable medium of claim 11, wherein the visualization identifies which maintenance operations will fix which known defects.

20. A method of operating a device, comprising:
receiving, by a processor, associated with the device, a job request;
determining, by the processor, a known defect that has been catalogued as part of a diagnostic routine and a maintenance routine to identify defects, wherein the know defect is based on at least one of: a job function, a type of paper, and a machine state; and
presenting, by the processor, a visualization of the known defect on a display of a user interface before executing the job request, wherein the visualization illustrates the known defect and presents an option for a user to ignore the known defect and continue with execution of the job request.

* * * * *